United States Patent
Herter et al.

(10) Patent No.: US 7,228,215 B1
(45) Date of Patent: Jun. 5, 2007

(54) METHOD FOR OPERATION OF AUTOMATIC CLUTCH APPARATUS

(75) Inventors: Peter Herter, Ravensburg (DE); Robert Anthony Sayman, Laurinburg, NC (US); Rupert Kramer, Friedrichshafen (DE); Ronald Muetzel, Friedrichshafen (DE); Jim Devore, Laurinburg, NC (US); Abu Samra Muneer, Southern Pines, NC (US)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 11/433,819

(22) Filed: May 12, 2006

(51) Int. Cl.
*G06F 7/00* (2006.01)
(52) U.S. Cl. ............... 701/54; 701/56; 701/67; 192/31; 192/3.57; 477/166
(58) Field of Classification Search ............ 701/1, 701/51–56, 67, 68; 192/30 R, 31, 3.51, 3.57; 477/166–175
See application file for complete search history.

(56) References Cited

U.S. PATENT DOCUMENTS

| 5,004,086 A | | 4/1991 | Petzold et al. | |
|---|---|---|---|---|
| 5,704,460 A | * | 1/1998 | Leimbach | 192/70.25 |
| 5,954,176 A | * | 9/1999 | Ishihara et al. | 192/83 |
| 6,883,658 B2 | * | 4/2005 | Reul et al. | 192/98 |
| 6,899,655 B2 | * | 5/2005 | Eggert et al. | 477/174 |

FOREIGN PATENT DOCUMENTS

EP  0 371 975 B1  4/1992

* cited by examiner

*Primary Examiner*—Richard M. Camby
(74) *Attorney, Agent, or Firm*—Davis Bujold & Daniels, P.L.L.C.

(57) ABSTRACT

The proposal is to compare determined measurement values in the form of the actual engagement position to a set engagement speed of the clutch apparatus with a set position and a set engagement speed so that, upon the attainment of a known set-position and the presence of a defined deviation or a trend toward a diversion in the concept of an overstepping of the set engagement speed, the set engagement speed of the clutch apparatus is braked to a predetermined engagement speed which prevents an undesired engagement impact of the clutch apparatus or at least alleviates an excessive engagement speed.

8 Claims, 2 Drawing Sheets

METHOD FOR OPERATION OF AUTOMATIC CLUTCH APPARATUS

FIELD OF THE INVENTION

The invention concerns a method of operating an automatic clutch apparatus.

BACKGROUND OF THE INVENTION

Automatic clutch apparatuses for a drive train of a vehicle, located between a drive machine and a transmission, have been known for a long time. For example, EP 0 371 975 B1 discloses a clutch apparatus, in particular, a clutch apparatus for a motor vehicle which is engaged by spring action, i.e., engaged by spring force. The clutch can be disengaged by a pressure reactive piston-cylinder combination controlled by a solenoid valve that is disengaged in this manner. Air or some other fluid medium, such as hydraulic or brake fluid, can serve as an operative means for disengaging the clutch.

It is necessary that the pressure chamber of the piston-cylinder combination be purged of air or other fluid medium so the closure spring can function properly. For this purpose, each solenoid valve or its related actuation member is regulated by an electronic control center. The maximum opening speed can be altered by the use of orifices which essentially change the effective cross-sectional flow area of the pressure lines leading to the pressure chamber. For each solenoid valve, two orifices are proposed, one for filling and one for de-aeration of the pressure chamber. These respective orifices would be opened for different durations of time as determined by a pulse modulation system. When this is done, different filling and de-aeration time ratios exist because, due to changes of the pulse modulation, the open-time for each valve is allowed to be changed.

The practice has further shown that during engagement of automatic clutches, so-called clutch engagement impacts occur (hereinafter "clutch impact" or "clutch impacts"). These sudden and forceful gear engagements detract from the driving comfort and exhibit themselves as a detectable rough step in an otherwise smooth vehicle operation and are to be avoided. Clutch impact occurs during the transition from a disengaged clutch to a partially engaged clutch during the buildup of torque. Clutch impact is noticeably apparent to and undesired by the occupant during a gear stage engagement, as well as a partial gear stage engagement. This, so to speak, is a gearing resolution tooth-to-tooth problem.

The causes for such clutch impacts are numerous and can result, for example, from the transition from a holding or a gripping contact to a sliding or a slipping contact (stick slip effect); mechanical hysteresis; the curve of the spring characteristic line of the clutch wherein a non-linear path of force is inaccurately reproduced. In the case of identical levels of disengagement force, various possibilities of force travel directions and inaccuracies in interconnection of parts are available.

Recognizing this background, the invention encompasses the purpose of providing a method for the operation of an automatic clutch apparatus by which the clutch impact can be avoided as much as possible or, at the very least, the clutch impact may be minimized so that the driving comfort is improved and the vehicle operates smoothly, e.g., detectable rough gear steps are substantially avoided.

SUMMARY OF THE INVENTION

Given an incipient, i.e., a directly impending clutch impact, the inherent understanding of the invention is that this event can be evaluated as a rapid clutch engagement movement, when directly observed and provided with an analysis of the time related succession of clutch position and speed during activation of the clutch.

The invention proposes a method for operating an automatic clutch apparatus, based on the above, which is placed in a drive train between the driving motor and the transmission. The clutch of the apparatus typically is engaged by spring force (although other mechanisms could also be utilized) and is released by a pressure loaded piston-cylinder combination, wherein provision is made for valve units have actuation members for application of pressure to the piston-cylinder combination and for purging air therefrom. Further, one or more operational conditions of the clutch apparatus are automatically detected by at least one sensor device whereby an electronic control unit for the regulation of the valve actuation members is energized and with which the engagement/disengagement movement of the clutch apparatus is adjusted during operation.

In addition, provision is made for prevention of undesired clutch impact in that:

a) on a continuous basis, a true or actual clutch impact position and speed of motion toward impact is to be determined by the at least one sensor;

b) the at least one sensor generates signals which are sent to the electronic control unit;

c) the electronic control unit determines or forms, from the acquired sensed data, a true or actual impact position and the true or actual engagement speed of the clutch apparatus, and the position and/or the speed is compared with a predetermined stored set position and a correlated set engagement speed; and d) upon attainment of a defined set position and considering the now available deviation or trend of a diversion in the concept of an overstepping of the set engagement speed, the true or actual engagement speed of the clutch apparatus is braked or adjusted to attain the predetermined engagement of the clutch which results in a smooth and gentle engagement of the clutch which prevents, or at the very least minimizes, clutch impact.

In an advantageous development of this method, it is proposed that if the set engagement speed is overstepped or greater than desired, the actual engagement speed is reduced by a corresponding control of the actuation members of the valve unit which reduce or decrease the de-aeration speed or the rate of de-aeration of the piston-cylinder combination.

Further, if the predetermined engagement speed is overstepped or greater than desired, then a reduction of the actual engagement speed occurs by way of an appropriate control of the actuation members of the valve units in such a manner that according to a type of counter impulse with which the piston-cylinder combination operates, de-aeration of the cylinder can be temporarily interrupted.

If the set engagement speed is overstepped or greater than desired, a reduction of the actual engagement speed can be effected by an appropriate control of the actuation members of the valve units in such a manner that, according to a kind of counter pulsations to which the piston-cylinder combination is subjected, de-aeration, which is carried out by way of incremental pressure loading thereof, can be interrupted.

In the development of the method, provision is made that a reduction of the clutch impact speed is terminated as soon as the clutch engagement speed, which was previously is too great, terminates and/or the required set clutch impact speed is attained.

Additional provision is given that to in order to avoid hunting in the clutch system, the act of reducing the closure speed of the clutch only occurs once per clutch engaging incident.

The method further proposes that a sensor, such as a distance-time measuring device, is utilized. This combines, in the simplest possible case, a clock and a distance sensor for determining the clutch activation path.

BRIEF DESCRIPTION OF THE DRAWING

The invention will now be described, by way of example, with reference to the accompanying drawings in which.

DETAILED DESCRIPTION OF THE INVENTION

Figure 2:
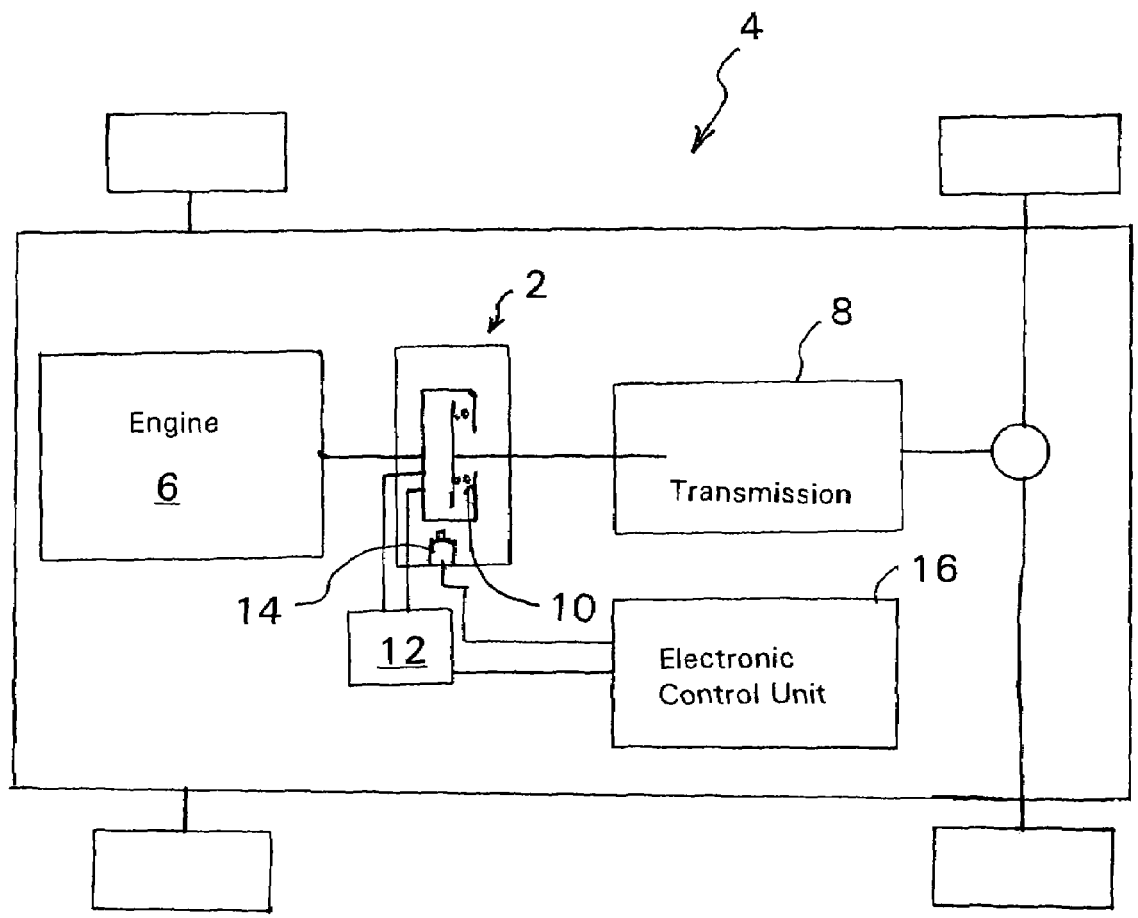
FIG. 2 is a diagrammatic drawing of a vehicle incorporating a drive train for use with the invention.

Automatic clutch apparatuses (one of which is shown in FIG. 2 of the drawings as element 2) are placed in drive trains and, in particular, in the drive train of a motor vehicle 4 between an engine or a driving machine 6 and a transmission 8. The clutch apparatus 2 is typically engaged by a known force, e.g., a spring force 10 and is released or disengaged by a respective actuator(s) 12, each of which could be operated by an external force such as a pneumatic or a hydraulic force, for example. These actuators 12 consist of at least one piston-cylinder combination (not separately labeled) predominately consisting of a thrust cylinder and a retracting cylinder attached thereto, which combination itself operates a device for releasing the clutch. Further, valve units associated with actuator members 12 are provided for supplying the piston-cylinder combination with a pressure medium and for carrying out the de-aeration.

As has already been mentioned above, it is possible that, during the activation of automatic clutches of the transmission, the above described clutch impacts can occur which reduce driving comfort and produce a noticeable jolt during transition from a disengaged gear stage, i.e., a released clutch, to a partially engaged clutch at a time of torque buildup and concurrently to an engaged stage, i.e., partially engaged gear stage (release of a tooth-to-tooth gear basis).

Such clutch impacts can arise, for example, from a transition in the clutch release mechanism from an adherent friction to a sliding friction at the start of an engagement or a disengagement motion (stick slip effect), from mechanical hysteresis and/or from a spring membrane characteristics with a non-linear, force-distance curve. Clutch impact of this kind is shown, for a conventional clutch activation method, by the dotted line in the accompanying FIG. 1 which is depicted by a steep upswing of the curve.

Figure 1:
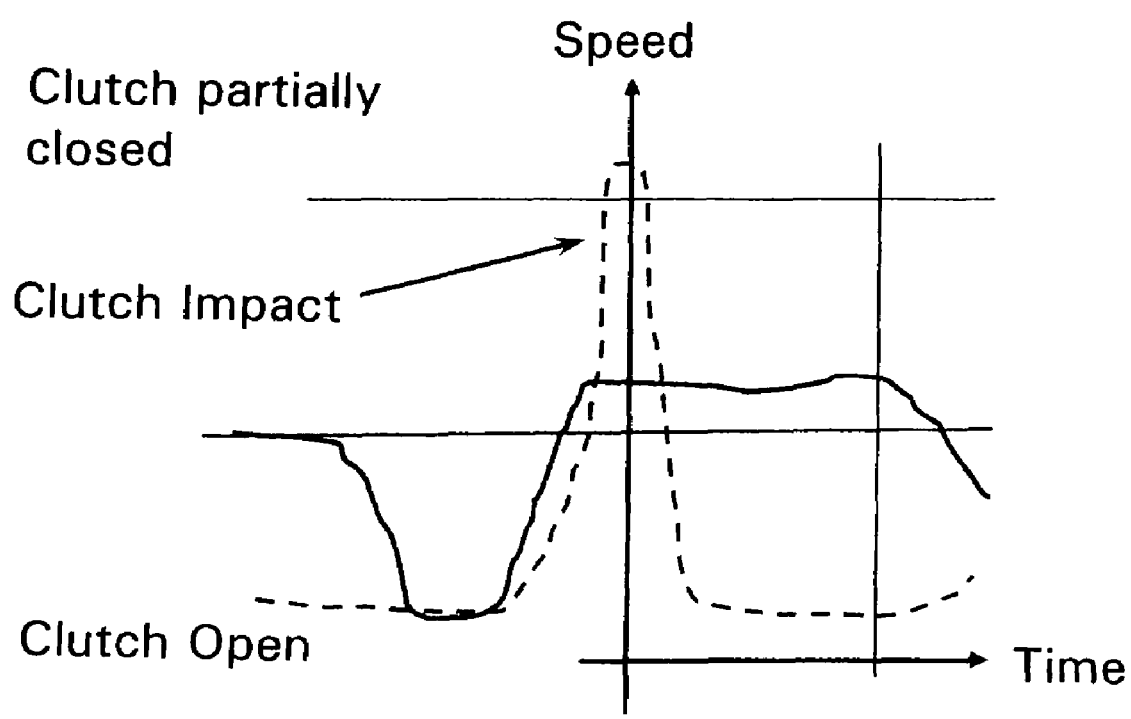
FIG. 1 shows a clutch activation movement of both a conventional clutch operational apparatus as well as for the inventive clutch operational apparatus according to the present method.

In order to effectively and immediately counter such disadvantageous clutch impact effect, a continuous curve over a time period is also shown in FIG. 1 which defines the actual position and the clutch impact speed as determined by at least one sensor 14. A known distance-way measurement is recommended as the sensor 14 and this sensor is connected to an electronic control unit 16 by conventional and well known signal technology connection techniques.

The signals, generated by the sensor, are measured values representing the actual engagement position(s) and speed(s) of the clutch apparatus and are subsequently compared, in a central electronic control unit 16, with corresponding predetermined set engagement positions and speeds for the clutch apparatus.

Given a situation where, after a set position has been attained, any deviation or any trend toward such a deviation, as seen in the concept of an overstepping of the set engagement speed, is important for smooth clutch operation. As seen by the curve, drawn as a solid line in FIG. 1, the actual engagement speed of the clutch apparatus, according to the invention, is braked or reduced to a predetermined clutch engagement speed which would prevent or stop clutch impact, or minimize clutch impact at the very least, to thereby result in a smooth and substantially jolt-free engagement of the clutch apparatus.

This step of the invented method is to be given special importance, considering that the actuating member of the known and described solenoid valve unit 16 is also regulated by appropriate signals from the electronic control unit in such a way that the de-aeration speed or the rate of de-aeration of the piston-cylinder combination of the clutch arrangement is reduced or otherwise adjusted or altered.

It is also possible, according to the invention, that the control of the actuation member is carried out in such a way that, according to the counter pulsations to which the piston-cylinder combination is conventionally subjected, the speed of de-aeration or the rate of de-aeration of the piston-cylinder combination of the clutch arrangement is temporarily interrupted for a short period of time, or for some other desired duration of time.

In a development of this step of the method, it is possible that the speed of de-aeration or the rate of de-aeration of the piston-cylinder combination of the clutch arrangement can also be temporarily effected by application of pressure to the piston-cylinder combination for a short period of time. According to the invention, the concept of a "short period" is to be understood that the braking, i.e., the reduction of the engagement speed, is to be removed as soon as the excessive engagement movement is obviated and/or the necessary set engagement speed is attained. The value of the clutch position signal and its derived values, such as the speed and the acceleration, are determined by the sensor and conveyed to the electronic control unit connected thereto.

For suppression of hunting in the clutch apparatus as a result of a defined influence of the actuation members of the valve units and the associated adjustment movements of the clutch units, a reduction of the engagement speed is normally carried out only once per engagement occasion and is subsequently advantageously blocked, in a manner acceptable to the control-technology, which is typically achieved by associated software. However, in the case of a newly required clutch apparatus engagement process, the blockage is removed.

The invention claimed is:

1. A method of operating an automatic clutch apparatus to reduce impact of a clutch apparatus, the clutch apparatus being placed in a drive train between a drive machine and a transmission, the clutch apparatus being engaged by a closing force and is disengaged by a piston-cylinder combination when pressure is applied thereto, valve units with actuation members facilitate supplying pressurized fluid to the piston-cylinder combination and facilitate de-aeration thereof, at least one sensor determines at least one operational condition of the clutch apparatus and sends at least one signal representative of the at least one operational condition to an electronic control unit for adjustment of a respective actuator member of the valve units such that an adjusted movement of the clutch apparatus is available, the method comprising the steps of:

determining on a continuous basis, by the at least one sensor, an actual engagement position and an actual engagement speed of the clutch apparatus toward impact;

generating the at least one signal by the at least one sensor and sending the at least one signal to the electronic control unit;

comparing, in the electronic control unit, data representing the actual engagement position and the actual engagement speed of the clutch apparatus with a stored predetermined set position and a correlated stored set engagement speed; and braking the actual engagement speed of the clutch apparatus, upon attainment of a defined set position or any deviation from a desired engagement speed, so as to attain a predetermined engagement of the clutch apparatus which minimizes, at the very least, the clutch impact.

2. The method according to claim 1, further comprising the step of, if the set engagement speed is overstepped, braking the actual engagement speed by corresponding control of the actuation members of the valve units so as to reduce a de-aeration rate of the piston-cylinder combination.

3. The method according to claim 1, further comprising the step of, if the set engagement speed is overstepped, braking the actual engagement speed by corresponding control of the actuation members of the valve units so that the de-aeration rate of the piston-cylinder combination is interrupted for a period of time in accord with a kind of counter pulsations to which the piston-cylinder combination is subjected.

4. The method according to claim 1, further comprising the step of, if the set engagement speed is overstepped, braking an actual engagement speed by corresponding control of the actuation members of the valve units so that the de-aeration rate of the piston-cylinder combination is interrupted for a period of time by pressure application to the piston cylinder combination in accord with the counter pulsations to which the piston-cylinder combination is subjected.

5. The method according to claim 1, further comprising the step of terminating braking of the engagement speed as soon as at least one of an excess engagement speed terminates and a required set engagement speed is attained.

6. The method according to claim 1, further comprising the step of braking the engagement speed only once per engagement of the clutch apparatus to avoid hunting in the clutch system.

7. The method according to claim 1, further comprising the step of employing a distance-time measurement device as the at least one sensor.

8. A method of operating an automatic clutch apparatus of a vehicle to minimize detection of clutch impact of a clutch apparatus, the clutch apparatus being located in a drive train between a drive machine and a transmission, the clutch apparatus being engaged by a closing force and is disengaged by a piston-cylinder combination when pressure is applied thereto, actuation members facilitate supplying pressurized fluid to the piston-cylinder combination and facilitate de-aeration thereof, at least one sensor detects an operational condition of the clutch apparatus and sends a signal, representative of the operational condition, to an electronic control unit for adjustment of a respective actuator member for controlling engagement of the clutch apparatus, the method comprising the steps of:

determining on a continuous basis, by the at least one sensor, an actual engagement position and an actual engagement speed of the clutch apparatus toward impact;

generating a signal by the at least one sensor and sending the signal to the electronic control unit;

comparing, in the electronic control unit, data representing the actual engagement position and the actual engagement speed of the clutch apparatus with stored engagement positions and engagement speeds; and braking the actual engagement speed of the clutch apparatus, as necessary, to attain a predetermined engagement of the clutch apparatus which minimizes detection of clutch impact by an occupant of the vehicle.

* * * * *